US012790464B2

(12) United States Patent
Wu et al.

(10) Patent No.: US 12,790,464 B2
(45) Date of Patent: Nov. 10, 2026

(54) ONE COMPONENT THERMALLY CONDUCTIVE AMBIENT TEMPERATURE CURABLE MATERIALS

(71) Applicant: Henkel AG & Co. KGaA, Duesseldorf (DE)

(72) Inventors: Chunyong Wu, Plymouth, MN (US); Reid Chesterfield, Eden Prairie, MN (US); William Kramlinger, Chanhassen, MN (US)

(73) Assignee: Henkel AG & Co. KGaA, Duesseldorf (DE)

( * ) Notice: Subject to any disclaimer, the term of this patent is extended or adjusted under 35 U.S.C. 154(b) by 608 days.

(21) Appl. No.: 18/237,487

(22) Filed: Aug. 24, 2023

(65) Prior Publication Data

US 2023/0391986 A1 Dec. 7, 2023

Related U.S. Application Data

(63) Continuation of application No. PCT/US2022/020415, filed on Mar. 15, 2022.

(60) Provisional application No. 63/161,022, filed on Mar. 15, 2021.

(51) Int. Cl.

| | |
|---|---|
| ***C08K 7/18*** | (2006.01) |
| ***C08K 3/36*** | (2006.01) |
| ***C08K 5/57*** | (2006.01) |
| ***C08L 33/08*** | (2006.01) |

(52) U.S. Cl.

CPC .................. *C08K 7/18* (2013.01); *C08K 3/36* (2013.01); *C08K 5/57* (2013.01); *C08L 33/08* (2013.01); *C08K 2201/001* (2013.01); *C08K 2201/005* (2013.01); *C08L 2203/206* (2013.01)

(58) Field of Classification Search

CPC ... C08K 7/18; C08K 3/36; C08K 5/57; C08K 2201/001; C08K 2201/005; C08L 33/08; C08L 2203/206

USPC .......................................................... 524/523

See application file for complete search history.

(56) References Cited

U.S. PATENT DOCUMENTS

| | | | |
|---|---|---|---|
| 3,632,557 | A | 1/1972 | George et al. |
| 5,717,034 | A | 2/1998 | Dershem et al. |
| 9,593,275 | B2 | 3/2017 | Tang et al. |
| 11,879,077 | B2 | 1/2024 | Watanabe |
| 2004/0127631 | A1 | 7/2004 | Kanamori et al. |
| 2009/0215944 | A1 | 8/2009 | Maton et al. |
| 2009/0281253 | A1 | 11/2009 | Okamoto et al. |
| 2013/0020025 | A1 | 1/2013 | Li et al. |

FOREIGN PATENT DOCUMENTS

| | | | | |
|---|---|---|---|---|
| CN | 1673274 | A | 9/2005 | |
| CN | 105102575 | A | 11/2015 | |
| JP | 2012162699 | A | 8/2012 | |
| JP | 2014024958 | A | 2/2014 | |
| JP | 5828835 | B2 | 12/2015 | |
| JP | 2016527183 | A | 9/2016 | |
| JP | 2019112580 | A | 7/2019 | |
| JP | 2019137771 | A | 8/2019 | |
| WO | 2012108458 | A1 | 8/2012 | |
| WO | WO-2013042638 | A1 * | 3/2013 | .......... H10W 40/251 |
| WO | 2013051721 | A1 | 4/2013 | |
| WO | 2014182902 | A2 | 11/2014 | |
| WO | 2019159753 | A1 | 8/2019 | |

OTHER PUBLICATIONS

PCT International Search Report—WO PCT/US2022/020415—Completed: Jun. 28, 2022 Mailing date: Jun. 28, 2022—Number of pp. 3.

* cited by examiner

*Primary Examiner* — Kelechi C Egwim

(74) *Attorney, Agent, or Firm* — Steven C. Bauman

(57) ABSTRACT

A moisture-curable thermally conductive material is provided in a one-component dispensable form and curable in situ. The material is formed from a non-silicone resin and exhibits a thermal conductivity of at least 1.0 W/m*K to effectively dissipate thermal energy from an electronic component heat source. The material is dispensable from a single-component dispensing system and is stable in storage.

11 Claims, No Drawings

ONE COMPONENT THERMALLY CONDUCTIVE AMBIENT TEMPERATURE CURABLE MATERIALS

BACKGROUND

Field

The present invention relates to thermal interface materials generally, and more particularly to mechanically conformable thermally conductive materials that may be formed in place following dispensation from a vessel. The one-part compositions of the invention are dispensable in a fluent state and moisture curable in situ at ambient temperature.

Brief Description of Related Technology

Thermally conductive materials are widely employed as interfaces between, for example, a heat-generating electronic component and a heat dissipater for permitting transfer of excess thermal energy from the electronic component to a thermally coupled heat dissipater. Numerous designs and materials for such thermal interfaces have been implemented, with the highest performance being achieved when gaps between the thermal interface and the respective heat transfer surfaces are substantially avoided to promote conductive heat transfer from the electronic component to the heat dissipater. The thermal interface materials therefore preferably mechanically conform to the somewhat uneven heat transfer surfaces of the respective components. An important physical characteristic of high performance thermal interface materials is therefore flexibility and a relatively low hardness.

Some example conformable thermal interface materials include silicone polymers forming a matrix that is filled with thermally conductive particles such as aluminum oxide, aluminum nitride, and boron nitride. The materials are typically sufficiently flexible to conform to irregularities of the interface surfaces, whether at room temperature and/or elevated temperatures. However, silicone-based materials may be incompatible in certain applications, such as where outgassing of silicone vapors may not be tolerated. Alternative non-silicone polymer systems have drawbacks that limit their adoption in thermal interface applications. Some conventional non-silicone systems that exhibit acceptable harness values also exhibit relatively high pre-cure viscosities that present challenges for dispensing and assembly. Other conventional non-silicone thermal gels that are packaged in a cured state may be sufficiently flowable for dispensation, but tend to pump out from the installation interfaces under heat and/or mechanical stress.

A form-in-place material that is dispensable from a single-component dispensing system as currently used in electronics manufacturing is a pursuit of the present invention. The dispensable material is preferably stable in storage, and is cured with moisture after application to arrest dislocation from intended interface position. The silicone-free thermal interface is formed from a relatively low viscosity composition, and is curable to a durometer hardness that is stable over time, even with exposure to elevated temperatures and significant mechanical stress.

SUMMARY

By means of the present invention, a highly thermally conductive silicone-free interface material may be formed from a composition exhibiting a viscosity suitable for dispensation as a fluent mass through conventional dispensing equipment, and thereafter cured in situ with moisture at ambient temperature to a desired durometer hardness. The dispensable viscosity of the present compositions facilitates low compression stress during apparatus assembly.

The composition generally includes three primary components: a non-silicone cross-linkable polymer including a reactive silyl group, thermally conductive particulate filler, and a diluent. Prior to curing, the composition exhibits a dispensable viscosity, and is curable to form a soft solid with high thermal conductivity. The diluent has a predetermined viscosity that lowers the overall composition viscosity under high shear rates, yet permits form stability upon application.

In one embodiment, a moisture-curable thermally conductive composition includes a non-silicone resin including a reactive silyl group, thermally conductive particulate filler, and a diluent having a viscosity of less than 1000 cP at 25° C. The thermally conductive composition exhibits a thermal conductivity of at least 1.0 W/m*K, and a pre-cured viscosity of more than 300 Pa*s at 1 $s^{-1}$ at 25° C. and less than 300 Pa*s at 1500 $s^{-1}$ at 25° C. The composition is curable in less than 72 hours at 25° C. in the presence of water to a durometer hardness of less than 80 Shore OO.

The moisture-curable thermally conductive composition may be dispensable as a coherent mass through an orifice. For the purposes hereof, the term "coherent" means united, or forming a whole.

A catalyst for the composition may be selected for facilitating condensation-type cross-linking of the non-silicone resin. In some embodiments, the catalyst may include an organotin or organobismuth compound.

In embodiments of the composition including a thickening agent, the composition may include less than 20 wt % of the non-silicone resin including the reactive silyl group, from 60-95 wt % of the thermally conductive particulate filler, less than 20 wt % of the diluent, less than 1 wt % of the thickening agent, and less than 0.5% of the catalyst. A cure of the composition may occur in the presence of water, such as at least 0.1 wt % of the composition.

An electronic apparatus may include an electronic component and the moisture-curable thermally conductive composition thermally coupled to the electronic component. In some embodiments, the composition is coated on the electronic component.

In one embodiment, a thermal interface is formed from a one-part dispensable mass including a non-silicone resin with a reactive silyl group, thermally conductive particulate filler, and a diluent, wherein the dispensable mass exhibits a viscosity of between 300,000 cP and 1,500,000 cP at 1 $s^{-1}$ at 25° C. to facilitate a stable form after dispensing, and a viscosity of between 50 cP to 200 cP at 1500 $s^{-1}$ at 25° C. to facilitate dispensation through an orifice. At least a portion of the dispensable mass may be dispensed through an orifice onto a surface and cured in the presence of water and at a temperature of less than 30° C. The thermal interface exhibits a thermal conductivity of at least 1.0 W/m*K and a durometer hardness of less than 80 Shore OO at 25° C.

DETAILED DESCRIPTION

The thermally conductive materials of the present invention may be used as a coating on a surface for placement along a thermal dissipation pathway, typically to remove excess heat from a heat-generating electronic component. The thermally conductive material is preferably silicone-free and filled with thermally conducive particles to achieve a desired thermal conductivity, typically at least 1.0 W/m*K. In a cured condition, the thermal material preferably remains conformable to surface roughness by exhibiting a durometer harness of less than about 80 Shore OO.

Generally, the thermally conducive material is formed from a composition that is dispensable from a single container as a one-part dispensable mass. Conventional one-part materials are often considered "gels", which are packaged in a cured condition for pre-cured dispensation. Commercial non-silicone thermal gels are typically fabricated from alkyl or other organic resins that tend to flow under heat or mechanical stress. The present materials instead employ reactive resins with thermally stable backbone and hindered reactive silyl groups, which are cured after application into a soft solid through silyl hydrolyzation and condensation in the presence of moisture from the environment or from water released from the object to which the thermal material is applied.

Resin

A wide variety of non-silicone resins may be usefully employed in the matrices of the present invention, limited by the resin system being storable and deliverable as a single component, wherein the resin matrix may be dispensed from a single coherent mass and thereafter cured. Multi-component systems, by contrast, require storage and delivery from separate masses to form the end product. The resin composition is also preferably curable at ambient temperature upon exposure to moisture sufficient to facilitate hydrolyzation and condensation cure.

The non-silicone bulk matrix of the compositions of the present invention include non-silicone cross-linkable polymer, wherein no more than a trace amount of silicone is contained in the composition.

Resin matrices employed herein are present in the range of about 1 up to about 90 percent by weight of the compositions; in some embodiments, the compositions comprise in the range of about 1 up to about 80 percent by weight resin matrix; in some embodiments, the compositions comprise in the range of about 1 up to about 50 percent by weight of resin matrix; in some embodiments, the compositions comprise in the range of about 1 up to about 20 percent by weight of resin matrix; in some embodiments, the compositions comprise in the range of about 1 up to about 10 percent by weight of resin matrix.

In some embodiments, resin matrices employed herein are present in the range of less than 10 by weight of the compositions; in some embodiments, the compositions comprise in the range of less than 8 percent by weight of resin matrix; in some embodiments, the compositions comprise in the range of less than 5 percent by weight of resin matrix.

In some embodiments, resin matrices employed herein are present in the range of about 5 up to about 90 percent by weight of the compositions; in some embodiments, the compositions comprise in the range of about 10 up to about 85 percent by weight resin matrix; in some embodiments, the compositions comprise in the range of about 20 up to about 80 percent by weight of resin matrix.

Example resins suitable for the resin matrix of the present invention include reactive polymer resins with at least one silyl-reactive functional group, including at least one bond that may be activated with water. Example silyl-reactive functional groups include alkoxy silane, acetoxy silane, and ketoxime silane.

The reactive polymer resin can be any reactive polymer capable of participating in a silyl hydrolyzation reaction. For example, the reactive polymer resin can be selected from a wide range of polymers as polymer systems that possess reactive silyl groups, for example a silyl-modified reactive polymer. The silyl-modified reactive polymers can have a non-silicone backbone to limit the release of silicone when heated, such as when used in an electronic device. Preferably, the silyl-modified reactive polymer has a non-silicone backbone. Preferably, the silyl-modified reactive polymer has a flexible backbone for lower modulus and glass transition temperature. Preferably, the silyl-modified reactive polymer has a flexible backbone of polyether, polyester, polyurethane, polyacrylate, polyisoprene, polybutadiene, polystyrene-butadiene, or polybutylene-isoprene.

The silyl-modified reactive polymer can be obtained by reacting a polymer with at least one ethylenically unsaturated silane in the presence of a radical starter, the ethylenically unsaturated silane carrying at least one hydrolyzable group on the silicon atom. For example, the silyl modified reactive polymer can be dimethoxysilane modified polymer, trimethoxysilane modified polymer, or triethoxysilane modified polymer. For example, the silyl modified reactive polymer may include a silane modified polyether, polyester, polyurethane, polyacrylate, polyisoprene, polybutadiene, polystyrene-butadiene, or polybutylene-isoprene.

The ethylenically unsaturated silane is particularly preferably selected from the group made up of vinyltrimethoxysilane, vinyltriethoxysilane, vinyldimethoxymethylsilane, vinyldiethoxymethylsilane, trans-β-methylacrylic acid trimethoxysilylmethyl ester, and trans-β-methylacrylic acid trimethoxysilylpropyl ester.

The silyl-modified reactive polymer preferably comprise(s) silyl groups having at least one hydrolyzable group on the silicon atom in a statistical distribution. For example, the silyl-modified reactive polymer can be a silane-modified polymer of general formula:

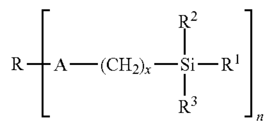

in which; R is a mono- to tetravalent polymer radical, $R^1$, $R^2$, $R^3$ independently is an alkyl or alkoxy group having 1 to 8 C atoms and A represents a carboxy, carbamate, amide, carbonate, ureido, urethane or sulfonate group or an oxygen atom, x=1 to 8 and n=1 to 4.

The silyl-modified reactive polymer can also be obtained by reacting a polymer with hydroxy group and alkoxysilane with isocyanate group. For example, the silyl modified reactive polymer can be dimethoxysilane modified polyurethane polymer, trimethoxysilane modified polyurethane polymer, or triethoxysilane modified polyurethane polymer. Further, the silyl-modified reactive polymer can be a α-ethoxysilane modified polymer of the average general formula:

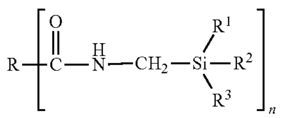

in which R is a mono- to tetravalent polymer residue, at most one third of the polymer of formula contained residues $R^1$, $R^2$ and $R^3$ are independently alkyl radicals having 1 to 4 carbon atoms, at least one-quarter of the polymer of the formula residues contained $R^1$, $R^2$, and $R^3$ are independently ethoxy residues that any remaining radicals $R^1$, $R^2$, and $R^3$ independently of one another are methoxy radicals, and wherein n=1 to 4.

Silyl-modified reactive polymers are available, for example, as dimethoxysilane modified MS polymer with polyether backbone and XMAP™ polymer with polyacrylate backbone from Kaneka Belgium NV, trimethoxysilane modified ST polymer from Evonik, triethoxysilane modified Tegopac™ polymer from Evonik, silane modified Desmoseal™ polymer from Covestro, or silane modified SMP polymer from Henkel.

Acrylates contemplated for use in the present invention as the resin backbone are well known in the art, as set forth in U.S. Pat. No. 5,717,034, the entire contents of which being incorporated herein by reference. Exemplary acrylates contemplated for use herein include monofunctional (meth) acrylates, difunctional (meth)acrylates, trifunctional (meth) acrylates, polyfunctional (meth)acrylates, and the like.

Exemplary monofunctional (meth)acrylates include phenylphenol acrylate, methoxypolyethylene acrylate, acryloyloxyethyl succinate, fatty acid acrylate, methacroloyloxyethylphthalic acid, phenoxyethylene glycol methacrylate, fatty acid methacrylate, β-carboxyethyl acrylate, isobornyl acrylate, isobutyl acrylate, t-butyl acrylate, hydroxyethyl acrylate, hydroxypropyl acrylate, dihydrocyclopentadiethyl acrylate, cyclohexyl methacrylate, t-butyl methacrylate, dimethylaminoethyl methacrylate, diethlylaminoethyl methacrylate, t-butylaminoethyl methacrylate, 4-hydroxybutyl acrylate, tetrahydrofurfuryl acrylate, benzyl acrylate, ehylcarbitol acrylate, phenoxyehtyl acrylate, methoxytriethlene glycol acrylate, monpentaerythritol acrylate, dipentaerythritol acrylate, tripentaerythritol acrylate, polypentaerythritol acrylate, and the like.

Exemplary difunctional (meth)acrylates include hexanediol dimethacrylate, hydroxyacryloyloxypropyl methacrylate, hexanediol diacrylate, urethane acrylate, epoxyacrylate, bisphenol A-type epoxyacrylate, modified epoxyacrylate, fatty acid-modified epoxyacrylate, amine-modified bisphenol A-type epoxyacrylate, allyl methacrylate, ethylene glycol dimethacrylate, diethylene glycol dimethacryrlate, ehoxylated bisphenol A dimethacrylate, tricyclodecanedimethanol dimethacrylate, glycerine dimethacrylage, polypropylene glycol diacrylate, propoxylated ethoylated bisphenol A diacrylate, 9,9 bis-(4-(2-acryloyloxyehoxy) phenyl) fluorine, tricyclodecane diacrylate, dipropyleneglycol diacrylate, polypropylene glycol diacrylate, PO-modified neopentyl glycol diacrylate, tricyclodecanedimethanol diacrylate, 1,12-dodecanediol dimethacrylate, and the like.

Exemplary trifunctional (meth)acrylates include trimethylolpropane trimethacrylate, trimethylolpropane triacrylate, trimethylolpropane ethoxy triacrylate, polyether triacrylate, glycerine propoxy triacrylate, and the like.

Exemplary polyfunctional (meth)acrylates include dipentaerythritol polyacrylate, dipentaerythritol hexaacrylate, pentaerythritol tetraacrylate, pentaerythriolethoxy tetraacrylate, ditrimethololpropane tetraacrylate, and the like.

Diluent

The present compositions preferably include a diluent to lower the viscosity of the dispensable mass, particularly under shear, and to maintain a flexibility/softness property when the composition is in a cured state. The cured compositions exhibit a relatively low modulus or hardness of less than 80 Shore OO to mitigate the stress in electronic component assembly and to promote conformability of the thermal material to respective contact surfaces of the electronic component.

Diluents useful in the present compositions are those which are effective in facilitating fluency of the coherent mass making up the composition. The diluents of the present invention may preferably be low-volatility liquids that reduce the viscosity of the overall pre-cured composition so that the composition is readably dispensable through liquid dispensing equipment. The diluent may therefore exhibit a viscosity of less than 1000 cP at 25° C. In another embodiment, the diluent may exhibit a viscosity of less than 500 cP at 25° C. In a further embodiment, the diluent may exhibit a viscosity of less than 200 cP at 25° C. Preferably, the diluent exhibits a viscosity of between 10-1000 cP at 25° C.

An aspect of the present invention is that the diluent does not participate in the polymer cross-linking reaction during cure. Moreover, the diluent does not itself cross-link, wherein the diluent retains a hardness reducing property to the cured composition. For the purposes hereof, the term "non-crosslinked" means that no reactant molecule is linked to more than two other reactant molecules unless the other reactant molecules are linked only to a single reactant molecule.

The diluent is preferably added to the composition in an amount suitable to appropriately adjust viscosity for pre-cured dispensability, and post-cured softness. In some embodiments, the diluent may represent about 1-50 percent by weight of the composition. In some embodiments, the diluent may represent about 1-20 percent by weight of the composition. In some embodiments, the diluent may represent about 1-10 percent by weight of the composition. The diluent may preferably be present at less than 20% by weight of the composition.

Example diluents include sebacates, adipates, terephthalates, dibenzoates, gluterates, phthalates, azelates, benzoates, sulfonamides, organophosphates, glycols, polyethers, and polybutadienes, epoxies, amines, acrylates, thiols, polyols, and isocyanates.

The non-silicone cross-linkable polymer forming the bulk matrix of the composition preferably forms a cross-linked network without reacting with the diluent. The applicant has found that non-silicone silyl-modified polymers (SMP), such as those described in U.S. Pat. No. 3,632,557 and U.S. Patent Application Publication No. 2004/0127631, the contents of which being incorporated herein in their entireties, may be particularly useful in the preparation of thermally conductive materials of the present invention.

Thermally Conductive Particles

In order to enhance thermal conductivity, the thermally conductive compositions of the present invention preferably include thermally conductive particles dispersed therein. The particles may be both thermally conductive and electrically conductive. Alternatively, the particles may be thermally conductive and electrically insulating. Example thermally conductive particles include aluminum oxide, aluminum trihydrate, zinc oxide, graphite, magnesium oxide, silicon carbide, aluminum nitride, boron nitride, metal particulate, and combinations thereof.

The thermally conductive particles may be of various shape and size, and it is contemplated that a particle size distribution may be employed to fit the parameters of any particular application. Thermally conductive particles used in the compositions of the present invention may be present in the range of about 20-95 percent by weight. In some embodiments, the compositions comprise in the range of about 50 up to about 95 percent by weight thermally conductive particles. In some embodiments, the compositions comprise in the range of about 80 up to about 95 percent by weight thermally conductive particles. In some embodiments, the compositions comprise in the range of about 90 up to about 95 percent by weight thermally conductive particles. In some embodiments, the compositions comprise between 90-95 percent by weight conductive particles.

The thermally conductive particles used in the compositions of the present invention have an average particle size ($d_{50}$) in the range of about 0.1 to about 250 micrometers. In some embodiments, the average particle size is in the range of about 0.5 to about 100 micrometers. In some embodiments, the average particle size is in the range of about 1 to about 50 micrometers. The thermally conductive particles may be spherical, rod-like, or plate-like in shape, and one or more particle shapes may be employed in the compositions of the present invention.

In a useful embodiment, the thermally conductive fillers comprise multiple sizes of particulate fillers. In a particularly useful embodiment, the fillers include 2 μm, 7 μm, and 70 μm fillers. The 2 μm fillers are present in the composition in an amount of about 5-20 wt. % based on the total weight of the filler mixture, 7 μm fillers are present in an amount of about 20-30 wt. % based on the total weight of the filler mixture, and 70 μm fillers present in an amount of about 50-75 wt. % based on the total weight of the filler mixture.

It is desirable that the composition of the present invention exhibits a thermal conductivity of at least 1.0 W/m*K, more preferably at least 3.0 W/m*K, and still more preferably at least 6 W/m*K.

Rheology Modifiers

Certain rheological modifiers may be included in the compositions of the present invention to aid in the flow characteristics, thixotropy, and dispensed form stability. The rheological modifiers useful in the present invention may include thickening agents such as fumed silica, organoclay, polyurethanes, and acrylic polymers. The rheological modifiers may also include dispersion agents for the thermally conductive fillers.

Thickening agents used in the compositions of the present invention are present in the range of about 0 up to about 3 percent by weight. In some embodiments, the compositions comprise in the range of about 0.01 up to about 1 percent by weight thickening agent. In some embodiments, the compositions comprise in the range of about 0.05 up to about 0.5 percent by weight thickening agent. In some embodiments, the compositions comprise less than 0.5 percent by weight thickening agent.

Reaction Catalyst

A reaction catalyst is employed to facilitate the cross-linking of the non-silicone resin. In some embodiments, the reaction catalyst facilitates condensation-type cross-linking of the non-silicone resin. Example reaction catalysts useful in the compositions of the present invention include organotin and organobismuth compounds that facilitate moisture cure of the non-silicone resins.

Reaction catalysts used in the compositions of the present invention are present in the range of about 0 up to about 2 percent by weight. In some embodiments, the compositions comprise in the range of about 0.01 up to about 0.5 percent by weight reaction catalyst. In some embodiments, the compositions comprise in the range of about 0.05 up to about 0.2 percent by weight reaction catalyst. In some embodiments, the compositions comprise less than 0.2 percent by weight reaction catalyst.

The thermally conductive compositions of the present invention are preferably curable in the presence of water (moisture curable) at ambient temperature. The moisture may be available from the ambient environment or from water released from the object(s) to which the composition is applied. For the purposes hereof, the term "ambient temperature" is intended to mean the temperature of the environment within which the reaction occurs, and within a temperature range of 15-30° C. The thermally conductive compositions are curable in the presence of water at ambient temperature within 72 hours, and preferably within 24 hours. The thermally conductive compositions may also be curable in the presence of water at elevated temperatures. For the purposes hereof, the term "curable" is intended to mean reactable to form a cross-linked network of a solidus body.

Water Scavenger

The compositions of the present invention preferably include a water scavenger for extended pot life. The water scavenger may be, for example, alkyltrimethoxysilane, oxazolidines, zeolite powder, p-toluenesulfonyl isocyanate, and ethyl orthoformate. The water scavenger is preferably vinyltrimethoxysilane. If too much of the water scavenger is included in the composition the curing will be slowed. In an amount of greater than about 0.05 wt. % and less than about 0.5 wt. %, for example about 0.1 wt. %.

Optional Additives

In accordance with some embodiments of the present invention, the compositions described herein may further comprise one or more additives selected from fillers, stabilizers, adhesion promoters, pigments, wetting agents, dispersants, flame retardants, and corrosion inhibitors.

Compositions

The composition can be useful as a thermal interface material, for example a thermal interface material for use in electronic devices. The composition cures to a soft solid at room temperature through silane hydrolyzation and condensation with external humidity in application.

The pre-cured dispensable compositions of the present invention are formulated to exhibit a viscosity of between 300 Pa*s and 1,500 Pa*s at 1 $s^{-1}$ and 25° C. In some embodiments, the pre-cured dispensable compositions are formulated to exhibit a viscosity of between 400 Pa*s and 1,200 Pa*s at 1 $s^{-1}$ and 25° C. In some embodiments, the pre-cured dispensable compositions are formulated to exhibit a viscosity of between 500 Pa*s and 1,000 Pa*s at 1 $s^{-1}$ and 25° C.

The pre-cured dispensable compositions of the present invention are formulated to exhibit a viscosity of less than 300 Pa*s at 1500 $s^{-1}$ and 25° C. In some embodiments, the pre-cured dispensable compositions are formulated to exhibit a viscosity of less than 200 Pa*s at 1500 $s^{-1}$ and 25° C. In some embodiments, the pre-cured dispensable compositions are formulated to exhibit a viscosity of less than 100 Pa*s at 1500 $s^{-1}$ and 25° C.

The resin components can be altered for application requirements. For application requiring the composition to be used above 100° C., silane modified polyacrylate can be used in the compositions along with low volatile diluent above 100° C. On the other hand, for application requiring the composition to be used below 80° C., silane modified polyether could be formulated can be used in the compositions along with low volatile diluent.

Examples

The Examples described herein are one-component thermally conductive materials using alkoxysilane modified polyacrylate as the reactive polymer component for applications requiring stable operation above 100° C. The example compositions include less than 10 wt. % alkoxysilane modified polyacrylate, less than 10 wt. % plasticizer with viscosity below 200 cP, less than 0.5 wt. % of liquid dispersion additive, less than 0.2 wt. % of the catalyst, less than 0.5 wt. % of thickener (fume silica), less than 0.5 wt. % water scavenger, and more than 90 wt. % alumina powders or alumina/alumina nitrile combined. Curing of the compositions is achieved by mixing the compositions with 0.1 wt. % water, so that the compositions become solid within about 24 hours. The hardness of a cured 250 mm puck measured by Shore OO durometer is between about 50 and about 80 Shore OO.

Example A was prepared by adding 80 g of trimellitate plasticizer, 20 g of dimethoxysilane terminated polyacrylate, 1 g of liquid rheology additive, 1 g of fume silica, 165 g of alumina filler with average size of 2 micron, 275 g of alumina filler with average size of 7 micron, 630 g of alumina filler with average size of 70 micron, 1 g of carbon black as pigment, 1 g of dibutyltin catalyst, and 1 g of water scavenger into a 0.6 gallon size of mixing bucket, and mixing twice at 800 rpm for 2 minutes with Flacktec DAC-5000 high speed mixer. Example B includes 2 phr thickener in the composition to increase low shear viscosity. Examples C and D include 2 micron size of aluminum nitrile filler instead of 2 micron size of alumina filler used in the compositions of Examples A and B to increase thermal conductivity. Each of Examples B-D is otherwise prepared with the same method as the Example A described above. Comparison of the composition of the samples are shown in Table 1.

TABLE 1

| Component | Examples/Amt (phr) A | B | C | D |
|---|---|---|---|---|
| Trimellitate plasticizer | 80 | 80 | 80 | 80 |
| Dispersion additives | 1 | 1 | 1 | 1 |
| Fume silica | 1 | 2 | 1 | 2 |
| Silane terminated polyacrylate | 20 | 20 | 20 | 20 |
| 7 micron size alumina powder | 275 | 275 | 275 | 275 |
| 70 micron alumina powder | 720 | 720 | 720 | 720 |
| 2 micron alumina powder | 165 | 165 | | |
| 2 micron aluminum nitrile powder | | | 165 | 165 |
| dibutyltin Catalyst | 1 | 1 | 1 | 1 |
| Carbon black | 1 | 1 | 1 | 1 |
| water scavenger | 1 | 1 | 1 | 1 |

The viscosity of thermally conductive compositions described in Examples A, B, C, and D was measured by parallel plate rheometer at 1 $s^{-1}$ shear rate at 25° C., and by capillary rheometer at 1500 $s^{-1}$ shear rate at 25° C. Hardness of the compositions was measured by using mixture of the materials with 0.1 wt. % water prepared with Flacktec DAC-5000 high speed mixer and curing for about 72 hours at room temperature. The hardness of a cured 250 mm thick puck was measured by Shore OO Durometer per ASTM D2240. Thermal conductivity of the cured puck was measured by Analysistech TIM1300 thermal tester with 90 PSI compression force per ASTM D5470. Comparison of the properties of the compositions are shown in Table 2.

TABLE 2

| Physical Property | Example A | Example B | Example C | Example D |
|---|---|---|---|---|
| Viscosity (Pa-s) @ 1 $s^{-1}$ | 323 | 376 | 377 | 540 |
| Viscosity (Pa-s) @ 1500 $s^{-1}$ | 85 | 91 | 87 | 97 |
| Curing hardness (Shore OO) | 74 | 79 | 74 | 79 |
| Thermal conductivity (W/m*K) | 3.3 | 3.3 | 4.6 | 4.6 |

Examples E, F, and G are one-component thermally conductive materials using alkoxysilane modified polyether as the reactive polymer component along with polyether plasticizer for better compatibility with the polymer. Example E includes less than 10 wt. % alkoxysilane modified polyether, less than 10 wt. % polyether plasticizer with viscosity below 500 cP, less than 0.5 wt. % of liquid dispersion additives, less than 0.2 wt. % of the catalyst, less than 0.5 wt. % of thickener (fume silica), less than 0.5 wt. % water scavenger, and more than 90 wt. % alumina powders. Example E was prepared by adding 85 g of polyether polyol with average Mw of 2000, 15 g of dimethoxysilane terminated polyether, 1 g of liquid rheology additive, 1 g of thickener (fume silica), 165 g of alumina filler with average particle size of 2 μm, 275 g of alumina filler with average particle size of 7 μm, 630 g of alumina filler with average particle size of 70 μm, 1 g of carbon black as pigment, 1 g of dibutyltin catalyst, and 1 g of water scavenger into a 0.6 gallon mixing bucket, and mixing twice at 800 rpm for 2 minutes with Flacktec DAC-5000 high speed mixer. Example F and G have 25 g and 35 g of dimethoxysilane terminated polyether in the compositions, respectively, instead of 15 g used in the composition of Example E to increase the hardness of the cured compositions. Each of Examples F, G are otherwise prepared with the same method as for Example E described above. Comparison of the composition of the samples are shown in Table 3. The properties of the compositions of Examples E, F, and G are measured similarly to Examples A to D described above, and are shown in Table 4.

TABLE 3

| Component | Examples/Amt (phr) E | F | G |
|---|---|---|---|
| Polyether plasticizer | 85 | 75 | 65 |
| Dispersion additives | 1 | 1 | 1 |
| Thickener | 1 | 1 | 1 |
| Silane terminated polyether | 15 | 25 | 35 |
| 7 micron size alumina powder | 275 | 275 | 275 |
| 70 micron alumina powder | 720 | 720 | 720 |
| 2 micron alumina powder | 165 | 165 | 165 |
| dibutyltin Catalyst | 1 | 1 | 1 |
| Carbon black | 1 | 1 | 1 |
| water scavenger | 1 | 1 | 1 |

TABLE 4

| Physical Property | Example E | Example F | Example G |
|---|---|---|---|
| Viscosity (Pa-s) @ 1 1/s | 686 | 670 | 650 |
| Viscosity (Pa-s) @ 1500 1/s | 87 | 93 | 101 |
| Curing hardness (Shore OO) | 63 | 56 | 52 |
| Thermal conductivity (w/m*K) | 3.3 | 3.3 | 3.3 |

The invention has been described herein in considerable detail in order to comply with the patent statutes, and to provide those of ordinary skill in the art with the information needed to apply the novel principles and to construct and use embodiments of the invention. However, it is to be understood that various modifications can be accomplished without departing from the scope of the invention itself.

That which is claimed is:

1. A moisture-curable thermally conductive material, comprising:

(a) a non-silicone resin including a reactive silyl group selected from the group consisting of a polymer having a polyether or a polyacrylate backbone;

(b) thermally conductive particulate filler present in amounts of 60-95% by weight of the total conductive material;

(c) a non-reactive diluent, and having a viscosity of less than 1000 cP at 25° C.;

(d) a condensation-type catalyst; and (e) a thickening agent;

wherein the thermally conductive material exhibits a thermal conductivity of at least 1.0 W/m*K and a pre-cured viscosity of more than 300 Pa*s at 1 $s^{-1}$ and 25° C. and less than 300 Pa*s at 1500 $s^{-1}$ and 25° C., and is curable in less than 72 hours at 25 ° C. in the presence of water to a hardness of less than 80 Shore OO at 25° C.

2. The moisture-curable thermally conductive material of claim 1 being dispensable as a coherent mass through an orifice.

3. The moisture-curable thermally conductive material of claim 1, whelein the catalyst includes an organotin or an organobismuth compound.

4. The moisture-curable thermally conductive material of claim 1, including a water scavenger.

5. The moisture-curable thermally conductive material of claim 1, including: less than 20 wt % of the non-silicone resin including the reactive silyl group;

less than 20 wt % of the diluent;

less than 1 wt % of the thickening agent; and less than 0.5 wt % of the catalyst.

6. The moisture-curable thermally conductive material of claim 5 wherein the presence of water includes about 0.1 wt % water.

7. The moisture-curable thermally conductive material of claim 6 wherein the reactive silyl group includes one or more of dimethoxysilane, trimethoxysilane, and triethoxysilane.

8. The moisture-curable thermally conductive material of claim 7 being curable in less than 24 hours at 25° C. in the presence of water.

9. The moisture-curable thermally conductive material of claim 1 wherein the diluent has a viscosity of less than 200 cP at 25° C.

10. An electronic apparatus, comprising: an electronic component; and the moisture-curable thermally conductive material of claim 1 thermally coupled to the electronic component.

11. The electronic apparatus of claim 10, wherein the moisture-curable thermally conductive material is coated on the electronic component.

* * * * *